3,426,273
SIGNAL GENERATOR FOR PRODUCING A PREDETERMINED NUMBER OF ELECTRICAL PULSES
Louis E. Kuntz, William C. Hahn, and Merle C. Rhoades, Bartlesville, Okla., assignors to Phillips Petroleum Company, a corporation of Delaware
Filed Sept. 15, 1966, Ser. No. 579,562
U.S. Cl. 324—68          5 Claims
Int. Cl. G01r *11/00;* G06f *15/18*

This invention relates to apparatus for generating a preselected number of electrical pulses.

By various industrial and laboratory operations, counters are employed to measure the number of electrical pulses which occur in a preselected time interval or the rate at which the pulses occur. One particular example of the use of such a counter is in measuring the rate of fluid flow by a turbine meter. A counter is employed to measure the speed of rotation of an impeller positioned in the flow being measured. It is desirable to test counters of this type periodically to determine if they are functioning properly. Heretofore, it has generally been necessary to dismantle the equipment and send the counters to a laboratory for testing.

In accordance with this invention, a portable signal genertaor is provided which can be used to test electrical counters. The signal generator comprises a magnet which is rotated by a motor at a predetermined speed. The magnet is positioned adjacent a coil so as to induce an alternating voltage across the coil, the frequency of which is proportional to the speed of rotation of the magnet. The electrical signal thus induced in the coil comprises a series of pulses which can be applied to the counter being tested. A counting device is connected to the motor to indicate the revolutions of the magnet, and switching means are associated with this counting device to open the output circuit from the coil when the magnet has made a preselected number of revolutions. In this manner a known number of pulses is applied to the counter being tested in order to check its accuracy.

Accordingly, it is an object of this invention to provide apparatus for generating a preselected number of electrical pulses. Another object is to provide a portable signal generator which can be used to test electrical counters. Other objects, advantages and features of the invention should become apparent from the following detailed description, taken in conjunction with the accompanying drawing in which.

Figure 1:
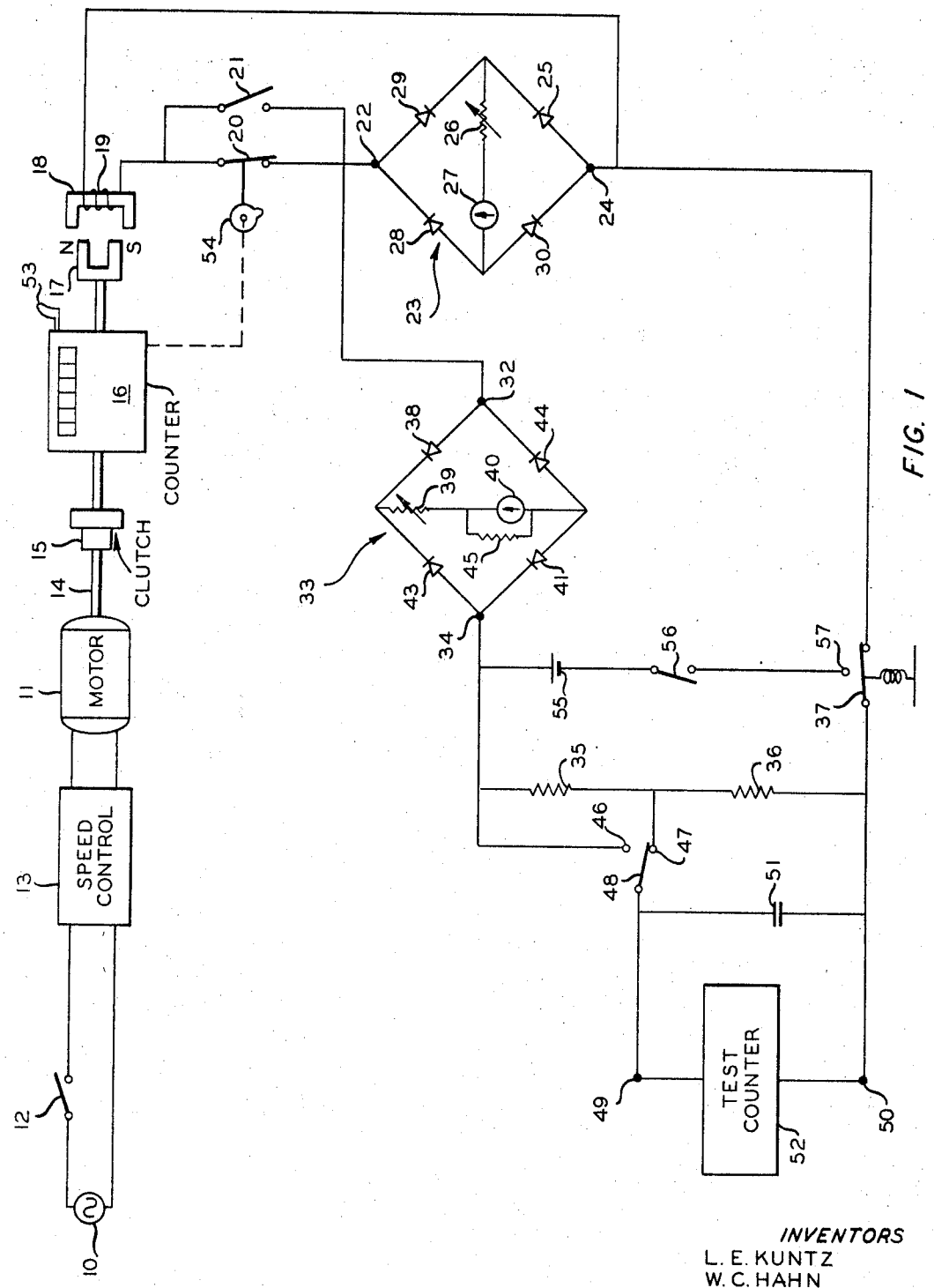
FIGURE 1 is a schematic drawing of the electrical components of the signal generator of this invention.

Referring now to the drawing in detail and to FIGURE 1 in particular, a current source 10 is applied to a motor 11 through a switch 12 and a speed control device 13. Motor 11 can thus be rotated at a preselected speed which is set by control device 13. The drive shaft 14 of motor 11 is connected through a clutch mechanism 15 to a mechanical counter 16. This shaft, or an extension thereof, carries a permanent magnet 17 which is rotated adjacent a core of magnetic material 18. A coil 19 is wound on core 18 so that an alternating voltage is generated across the coil, the frequency of which is a function of the speed of rotation of magnet 17. An alternating signal is thus established which can be employed for test purposes.

One terminal of coil 19 is connected through parallel switches 20 and 21 to a terminal 22 of a frequency measuring bridge network 23. The second terminal of coil 19 is connected to the opposite terminal 24 of network 23. Terminal 24 is connected to terminal 22 through a rectifier 25, a variable resistor 26, a current indicating meter 27 and a rectifier 28. Terminal 22 is connected to terminal 24 through a rectifier 29, resistor 26, meter 27 and a rectifier 30. Meter 27 provides an indication of the frequency of the pulses generated across coil 19. Meter 27 can be calibrated by variable resistor 26.

Terminal 22 of bridge network 23 is connected to the first terminal 32 of a signal amplitude measuring bridge network 33. The opposite terminal 34 of bridge network 33 is connected through resistors 35 and 36 and a normally closed switch 37 to terminal 24 of bridge network 23. Terminal 32 is connected to terminal 34 through a rectifier 38, a variable resistor 39, a current indicating meter 40 and a rectifier 41. Terminal 34 is connected to terminal 32 through a rectifier 43, resistor 39, meter 40 and a rectifier 44. A resistor 45 is connected in parallel with meter 40. Meter 40 provides an indication of the amplitude of the pulses which appear across output resistors 35 and 36. The two end terminals of resistor 35 are connected to respective terminals 46 and 47, which terminals are adapted to be engaged selectively by a switch 48 that is connected to an output terminal 49. A second output terminal 50 is connected to resistor 36. A capacitor 51 is connected across output terminals 49 and 50. A counter 52 to be tested can be connected to output terminals 49 and 50.

Counter 16 is a mechanical counter of the type which is provided with a control switch that opens after the input shaft has made a preselected number of revolutions. Switch 20 represents this switch. However, for purposes of illustration, a cam 54 is shown which opens switch 20 after the counter 16 has made a preselected number of revolutions. This cam is actually a part of the counter. In testing the accuracy of counter 52 it is desirable to apply a preselected number of pulses to the counter to determine whether the counter actually registers such number. This preselected number of pulses is set manually on counter 16 so that switch 20 is opened after the required number of pulses has been applied to counter 52. Counter 16 can be of the type described in a bulletin of Veeder-Root Inc., Hartford, Conn., dated July 1959, for example.

It is often desirable to make certain that motor 11 is operating at a uniform rate of speed before the signal generating mechanism is actuated. This can be accomplished by the use of a clutch mechanism 15 which becomes engaged only after a preselected number of revolutions have been made. A clutch mechanism of this type is described in PIC Design Corp., East Rockaway, N.Y., Catalog #31, 1964, page 319, for example. However, this clutch mechanism is not necessary if motor 11 has sufficient torque to rotate magnet 17 at the desired rate of speed initially. As an alternative, certain commercially available counters 16 are provided with a reset knob 53 which can be depressed to reset the counter. As long as this knob remains depressed, the output shaft connected to magnet 17 does not rotate. Thus, counter 16 can manually be rendered inoperative until motor 11 is operating at its full speed.

The frequency of the output pulses can be adjusted by speed control device 13 to provide pulses at a preselected rate, as determined by the reading of meter 27. The amplitude of the pulses can be adjusted by variable resistor 39. In addition, switch 48 provides a means for selecting the amplitude of the output pulses applied to counter 52. A battery 55 is connected across resistors 35 and 36 when a switch 56 is closed and switch 37 is moved into engagement with a terminal 57. This permits single pulses to be applied to the counter as desired. Switch 37 normally is spring biased in a closed position to keep battery 55 removed from the circuit.

Figure 2:
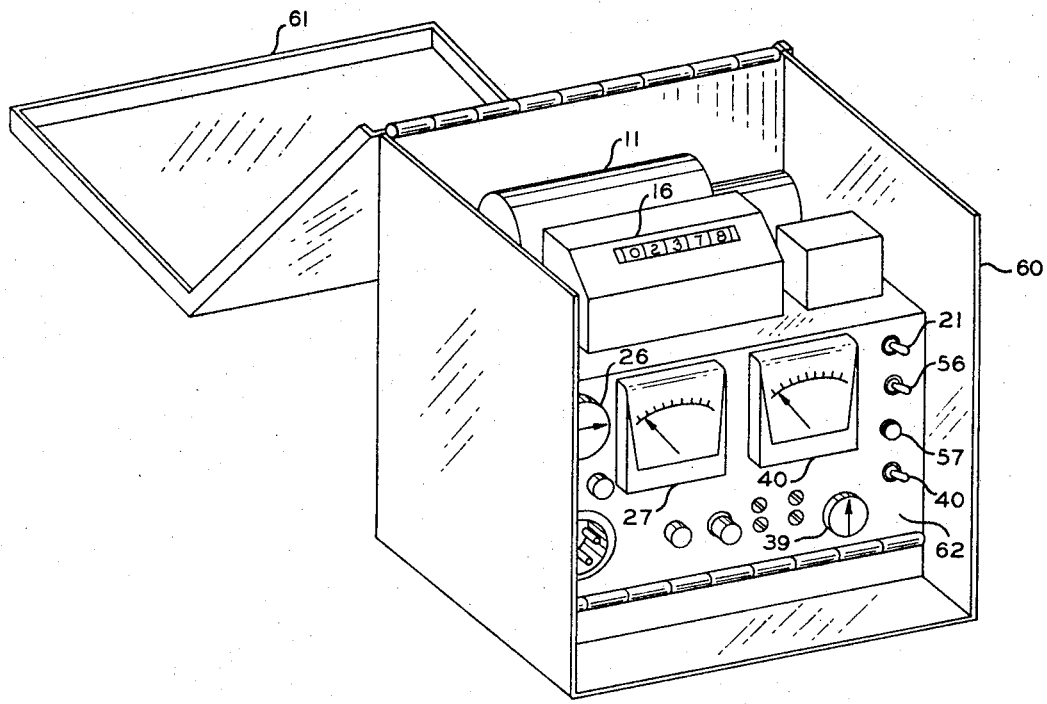
FIGURE 2 illustrates the signal generator positioned in its housing.
Figure 3:
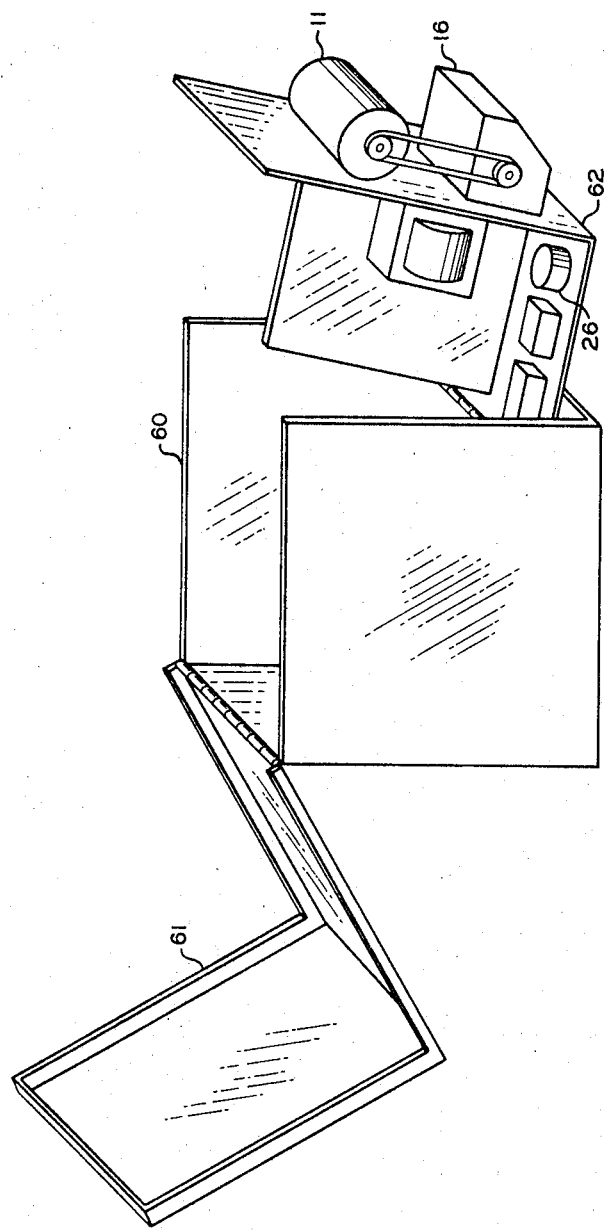
FIGURE 3 illustrates the housing in an open position to permit repairs to be made.

The signal generator of this invention can advantageously be mounted within a housing 60 which has a hinged lid 61, see FIGURE 2. The various switches, meters and adjusting dials are mounted on a front panel 62 which is hinged to the housing. By raising lid 61, the instrument is exposed to the operator. The hinged front panel can be raised to expose the electrical components and wiring, see FIGURE 3. This facilitates repairs when required in the field.

It should thus be evident that a compact, portable signal generator has been provided in accordance with this invention. While the invention has been described in conjunction with a presently preferred embodiment, it should be evident that it is not limited thereto.

What is claimed is:

1. An electrical testing apparatus comprising a motor having a drive shaft, a magnet, means connecting said magnet to said drive shaft so as to be rotated thereby, a coil positioned adjacent said magnet so that rotation of said magnet induces an alternating voltage across said coil, output circuit means connected to said coil to establish an alternating electrical signal of frequency which is proportional to the speed of rotation of said motor, switch means in said output circuit means, and counter means connected to said drive shaft and to said switch means so as to open said switch means when said drive shaft makes a predetermined number of revolutions.

2. The electrical testing apparatus of claim 1, further comprising clutch means connecting the drive shaft of said motor to said counter means and to said magnet, said clutch means being adapted to disconnect said drive shaft from said counter and said magnet until said drive shaft makes a predetermined number of revolutions and then to connect said drive shaft to said counter means and said magnet.

3. The signal testing apparatus of claim 1, further comprising means connected to said circuit means to indicate the frequency of pulses established in said circuit means, and means connected to said circuit means to indicate the amplitude of pulses established in said circuit means.

4. The signal testing apparatus of claim 1, further comprising output terminals, a voltage dividing network connected across said output circuit means, and means connecting said output terminals selectively to portions of said voltage dividing network to vary the amplitude of the signal applied to said output terminals from said output circuit means.

5. The signal testing apparatus of claim 4, further comprising a voltage source, and switching means to connect said voltage source selectively across said voltage dividing network.

References Cited

UNITED STATES PATENTS

| | | | |
|---|---|---|---|
| 2,403,873 | 7/1946 | Mumma | 235—132 |
| 2,629,009 | 2/1953 | Kassimir | 324—68 |
| 3,236,447 | 2/1966 | Grottrup | 235—132 |
| 3,238,764 | 3/1966 | Greiner | 324—68 |
| 3,241,017 | 3/1966 | Madsen | 328—48 |
| 3,296,618 | 1/1967 | Tuthill | 324—70 |
| 3,327,224 | 6/1967 | Mauchel | 328—48 |

RUDOLPH V. ROLINEC, *Primary Examiner.*

M. J. LYNCH, *Assistant Examiner.*

U.S. Cl. X.R.

324—70; 235—132; 73—1